United States Patent
Yang

(10) Patent No.: US 10,469,386 B2
(45) Date of Patent: Nov. 5, 2019

(54) NETWORK SHUNT WITH BYPASS

(71) Applicant: General Electric Company, Schenectady, NY (US)

(72) Inventor: Xiaoheng Yang, Vancouver (CA)

(73) Assignee: General Electric Company, Schenectady, NY (US)

( * ) Notice: Subject to any disclaimer, the term of this patent is extended or adjusted under 35 U.S.C. 154(b) by 106 days.

(21) Appl. No.: 15/676,774

(22) Filed: Aug. 14, 2017

(65) Prior Publication Data

US 2018/0337858 A1 Nov. 22, 2018

Related U.S. Application Data

(60) Provisional application No. 62/507,623, filed on May 17, 2017.

(51) Int. Cl.
*H04L 12/801* (2013.01)
*H04L 12/26* (2006.01)
*H04L 29/06* (2006.01)

(52) U.S. Cl.
CPC .......... *H04L 47/12* (2013.01); *H04L 43/0894* (2013.01); *H04L 43/16* (2013.01); *H04L 63/0254* (2013.01); *H04L 63/20* (2013.01); *H04L 43/12* (2013.01); *H04L 63/1408* (2013.01)

(58) Field of Classification Search
CPC ............................ H04L 47/12; H04L 43/0894
See application file for complete search history.

(56) References Cited

U.S. PATENT DOCUMENTS

2016/0219018 A1* 7/2016 Raman .................... H04L 63/02
2016/0285828 A1* 9/2016 Keohane ............ H04L 63/0245

FOREIGN PATENT DOCUMENTS

CN 106603427 * 4/2017 ........... H04L 12/801

* cited by examiner

*Primary Examiner* — Zhensheng Zhang
(74) *Attorney, Agent, or Firm* — Fitch Even Tabin & Flannery LLP

(57) ABSTRACT

A network firewall receives a first incoming data packet that is transmitted from an outside network to a destination within an internal network secured by the network firewall. The network firewall is configured to restrict access to the internal network based on a set of network policies. The network firewall compares a current inbound traffic rate at the network firewall to a threshold inbound traffic rate, yielding a comparison. The network firewall determines, based on the comparison, that the current inbound traffic rate at the network firewall is greater than a threshold inbound traffic rate, and forwards the first incoming data packet to the destination within the internal network without inspecting the first incoming data packet based on the set of network policies.

18 Claims, 12 Drawing Sheets

NETWORK SHUNT WITH BYPASS

CROSS-REFERENCE TO RELATED APPLICATIONS

The present application claims the benefit of priority of U.S. Provisional Application No. 62/507,623, filed on May 17, 2017, which is incorporated herein by reference in its entirety.

TECHNICAL FIELD

The present disclosure generally relates to the technical field of special-purpose machines that facilitate network security, including computerized variants of such special-purpose machines and improvements to such variants, and to the technologies by which such special-purpose machines become improved compared to other special-purpose machines that facilitate network security. In particular, the present disclosure addresses systems and methods for a network firewall including a network shunt with bypass.

BACKGROUND

Most people are familiar with the term Information Technology (IT), which covers the spectrum of technologies for information processing, including software, hardware, communications technologies and related services. Operation Technology (OT) is a relatively newer term that refers to hardware and software that detects or causes a change through the direct monitoring and/or control of physical devices, processes and events in the enterprise. For example, OT networks connect industrial control systems such as programmable logic controllers, supervisory control and data acquisition systems, distributed control systems, process control domains, safety instrumented systems, and building management and automation systems.

Traditionally, OT networks have operated separately from IT networks. For example, OT networks utilized proprietary protocols optimized for the required functions, some of which have become adopted as 'standard' industrial communications protocols (e.g., DNP3, Modbus, Profibus). More recently, IT-standard network protocols are being implemented in OT devices and systems to reduce complexity and increase compatibility with more traditional IT hardware (e.g., TCP/IP). This has led to a demonstrable reduction in security for OT systems as well as a significant potential increase in network traffic load.

Security approaches that are appropriate for IT networks may be inappropriate for OT networks. Also, existing security approaches for OT networks fail to bypass security policy-based inspection of traffic, responsive to traffic load.

BRIEF DESCRIPTION OF THE DRAWINGS

The drawings illustrate example embodiments of the present disclosure and do not limit the scope of the present disclosure.

DETAILED DESCRIPTION

A network firewall system ("firewall") establishes a barrier between a trusted secure network and an outside network (e.g., the Internet) that is assumed to be unsecure or untrusted. The firewall monitors and controls incoming and outgoing network traffic between the secured network and the outside network based on a set of predetermined security rules. For example, the firewall includes a packet inspection engine that analyzes incoming and outgoing data packets based on the set of predetermined security rules. The firewall forwards approved data packets towards their intended destination, while blocking data packets that are not approved.

In a heavily congested network, the packet inspection engine may become overwhelmed with packet throughput, causing increased network latency. To alleviate this issue, the firewall includes a software shunt, a feature enabled in software or a combination of software and hardware, that selectively forwards data packets to their intended destination without being inspected by the packet inspection engine, thereby providing a trade-off between security and speed. For example, the firewall determines whether the inbound traffic rate at the firewall meets or exceeds a threshold traffic rate, and if so, causes some received data packets to bypass the packet inspection engine and be forwarded to their intended destination. The firewall uses a software bypass of the software shunt to forward data packets from one network interface to another without passing through the packet inspection engine. The firewall can allow all data packets to bypass the packet inspection engine while the incoming traffic rate exceeds the threshold traffic rate, or, alternatively, may allow select data packets to bypass the packet inspection engine. For example, the firewall may allow select data packets to bypass the packet inspection engine based on protocol type (e.g., network protocols traditionally associated with OT may be bypassed in favor of IP packets associated with IT, or vice versa), based on packet contents, e.g., source IP address, destination IP address, or based on other packet characteristics. Thus, the software shunt allows the firewall to maintain packet throughput by sacrificing the obligation to inspect some traffic.

The following figures describe example embodiments, example environments of example embodiments, and example aspects thereof.

Figure 1:
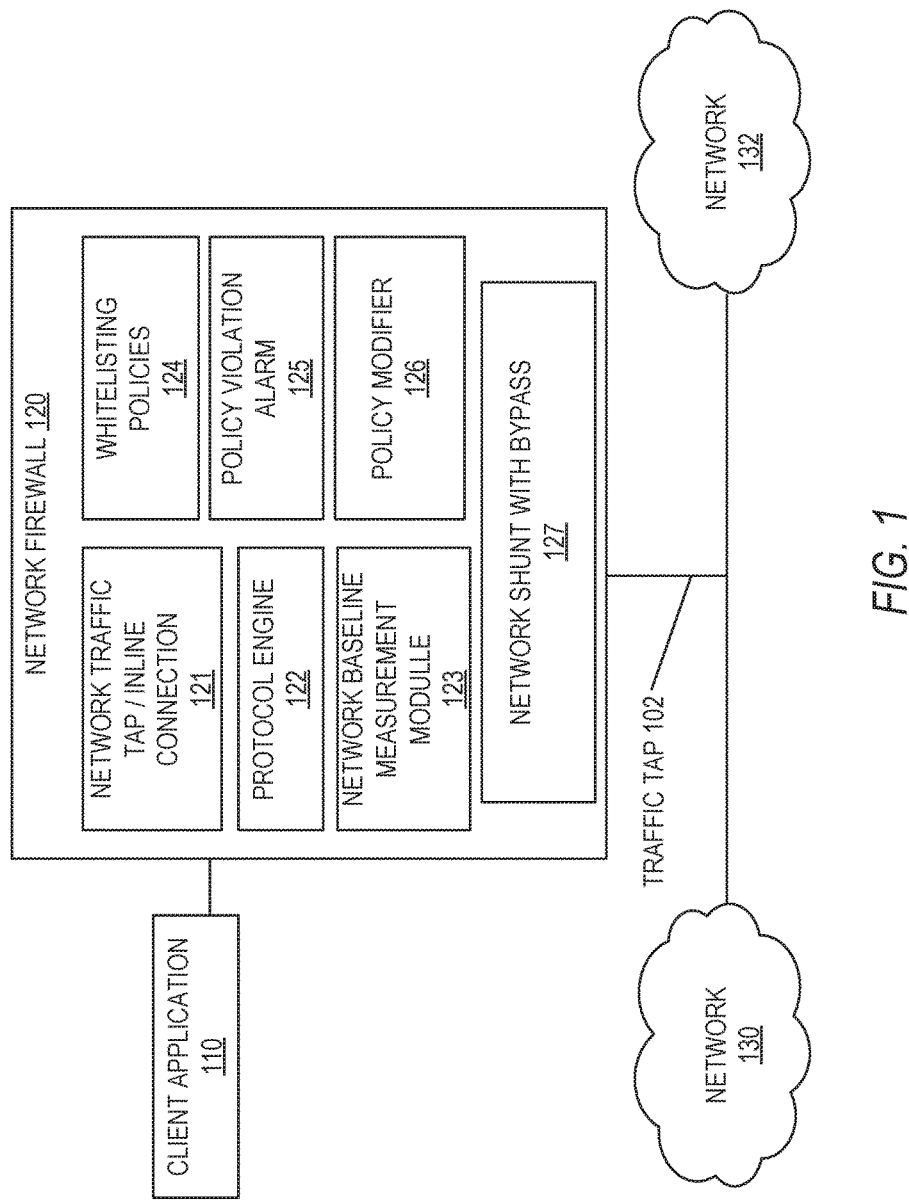
FIG. 1 is a block diagram of an example embodiment of an architecture of an operational technology firewall in a tap connection.

FIG. 1 is a block diagram of a network firewall system 120 including a network shunt with bypass 127, according to some example embodiments. To avoid obscuring the inventive subject matter with unnecessary detail, various functional components (e.g., modules, engines, etc.) that are not germane to conveying an understanding of the inventive subject matter have been omitted from FIG. 1. However, a skilled artisan will readily recognize that various additional functional components may be supported by the network firewall system 102 to facilitate additional functionality that is not specifically described herein. Furthermore, the various functional modules, engines, etc., depicted in FIG. 1 may reside on a single computing device (e.g., a single network security device) or may be distributed across several computing devices in various arrangements such as those used in cloud-based architectures. Further, the various functional modules, engines, etc., depicted in FIG. 1 may be implemented as either a physical network firewall or, alternatively, a virtual network firewall.

As shown, the network firewall system 120 is connected via a traffic tap 102 to a network 130 and a network 132. Network 130 and network 132 may include both an IT network and an OT network. The network firewall system 120 establishes a barrier between a trusted secure network (i.e., network 130) and an outside network (e.g., the Internet) that is assumed to be unsecure or untrusted (i.e., network 132). To accomplish this, the network firewall system 120 monitors and controls incoming and outgoing network traffic between the secured network 130 and the outside network 132 based on a set of predetermined security rules.

As shown, the network firewall system 120 includes a network traffic tap/inline connection 121, a protocol engine 122, a network baseline measurement module 123, whitelisting policies 124, a policy violation alarm 125, a policy modifier 126, and network shunt with bypass 127. A client application 110 controls and monitors the network firewall system 120.

The network traffic tap/inline connection 121 has physical and software components to read traffic from and send traffic to both the network 130 and the network 132. The protocol engine 122 processes read traffic from the network 130 and network 132 to extract commands and responses of an OT protocol such as Modbus, DNP3, IEC 60870, BACnet, LonWorks, EPICS, any other SCADA protocol, and any other OT protocol. The protocol engine 122 also processes commands and responses of an OT protocol and generates traffic to send to its intended destination.

The network baseline measurement module 123 monitors network traffic at the network firewall system 120, including data packets received from the network 130 and the network 132. The network baseline measurement module 123 uses the monitored network traffic to form a baseline of normal network traffic that assists in determining whether future network traffic is normal or a security risk.

The whitelisting policies 124 are formed based on the network baseline measurement module 123 with the assistance of the protocol engine 122 to form policies based on an understanding of commands and responses of an OT protocol. The policy violation alarm 125 executes a remedial action in response to a violation of a policy. Example remedial actions include transmitting a notification to a user for user intervention, as well as a suggestion of a new whitelisting policy to allow more network traffic. In an in-line configuration, another example of a remedial action is to block network traffic.

The policy modifier 126 responds to the policy violation alarm 125 by modifying the whitelisting policies 124 with the assistance of the protocol engine 122 to form policies based on an understanding of commands and responses of an OT protocol. In one example, the policy is stateful and allows certain sequences of one or more commands and/or one or more responses. In another example, the policy is stateless.

Figure 2:
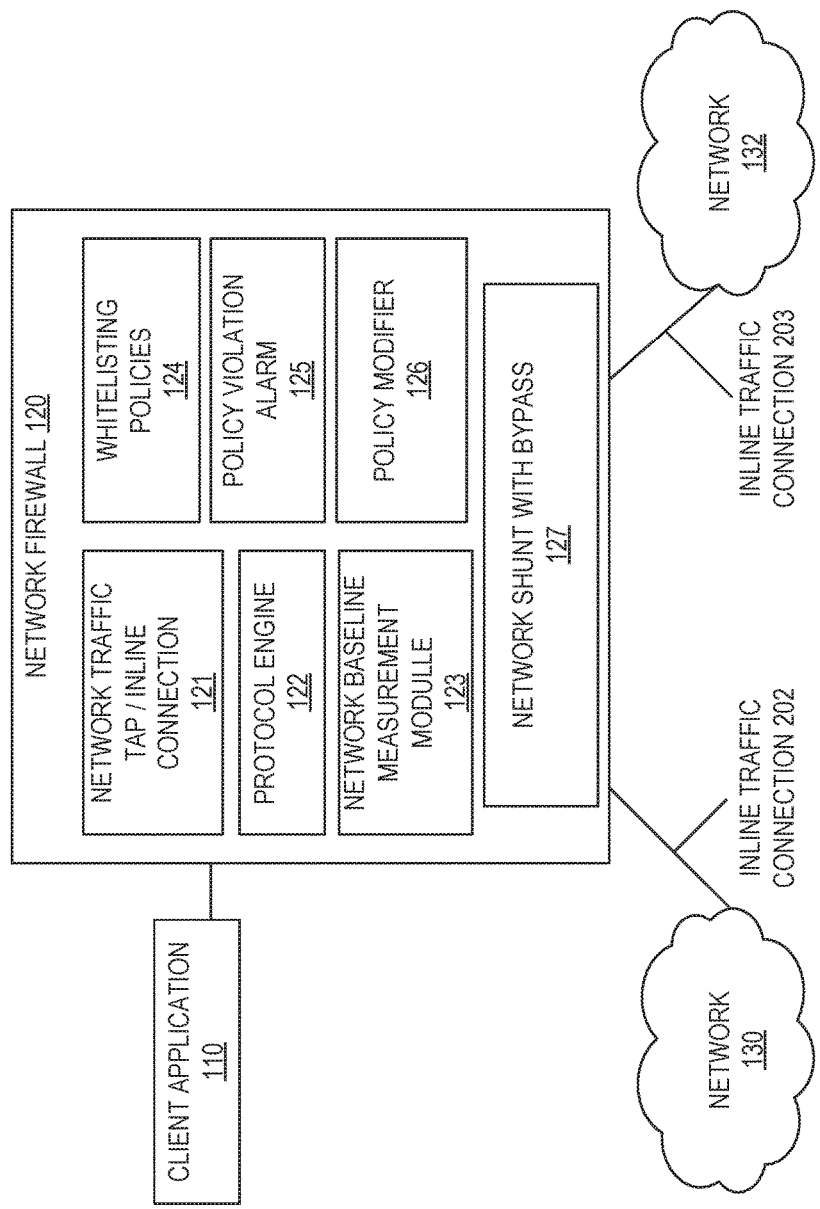
FIG. 2 is a block diagram of an example embodiment of an architecture of an operational technology firewall in an in-line connection.

FIG. 2 is a block diagram of a network firewall system 120 including a network shunt with bypass 127, according to some example embodiments. FIG. 2 is similar to FIG. 1, however, the network firewall system 120 is connected to the network 130 and the network 132 via respective inline traffic connections 202 and 203.

Figure 3:
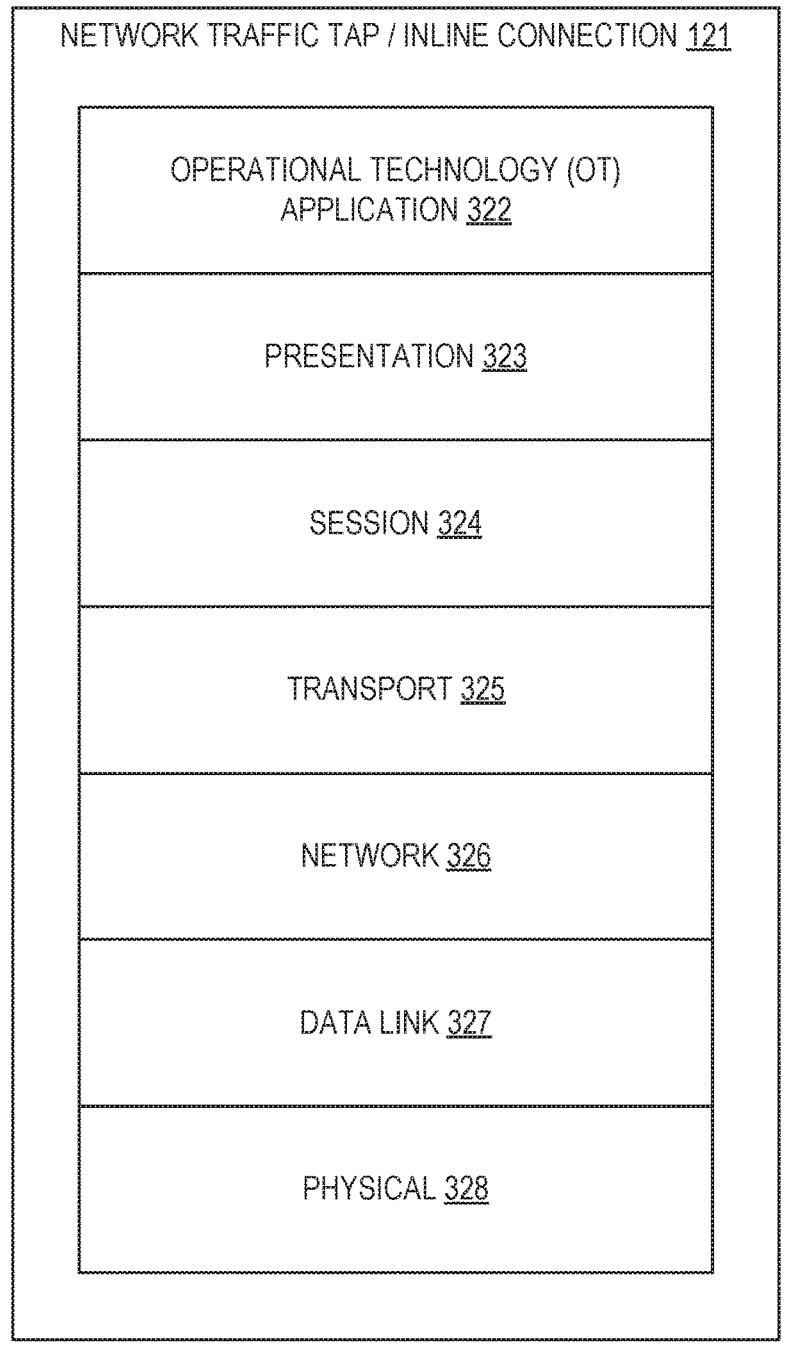
FIG. 3 is a diagram of an example embodiment of a network layer stack for network traffic that transits an operational technology shunt with bypass.

FIG. 3 is a diagram of a network layer stack for network traffic that transits a network shunt with bypass 127, according to some example embodiments. The layers in the network layer stack include an OT application layer 322, a presentation layer 323, a session layer 324, a transport layer 325, a network layer 326, a data link layer 327, and a physical layer 328. An example OT protocol borrows some aspects from an IT protocol, but modifies others. For example, the health care Digital Imaging and Communications in Medicine (DICOM) protocol uses a network stack with Ethernet, Internet Protocol, Transmission Control Protocol, and DICOM layers.

Figure 4:
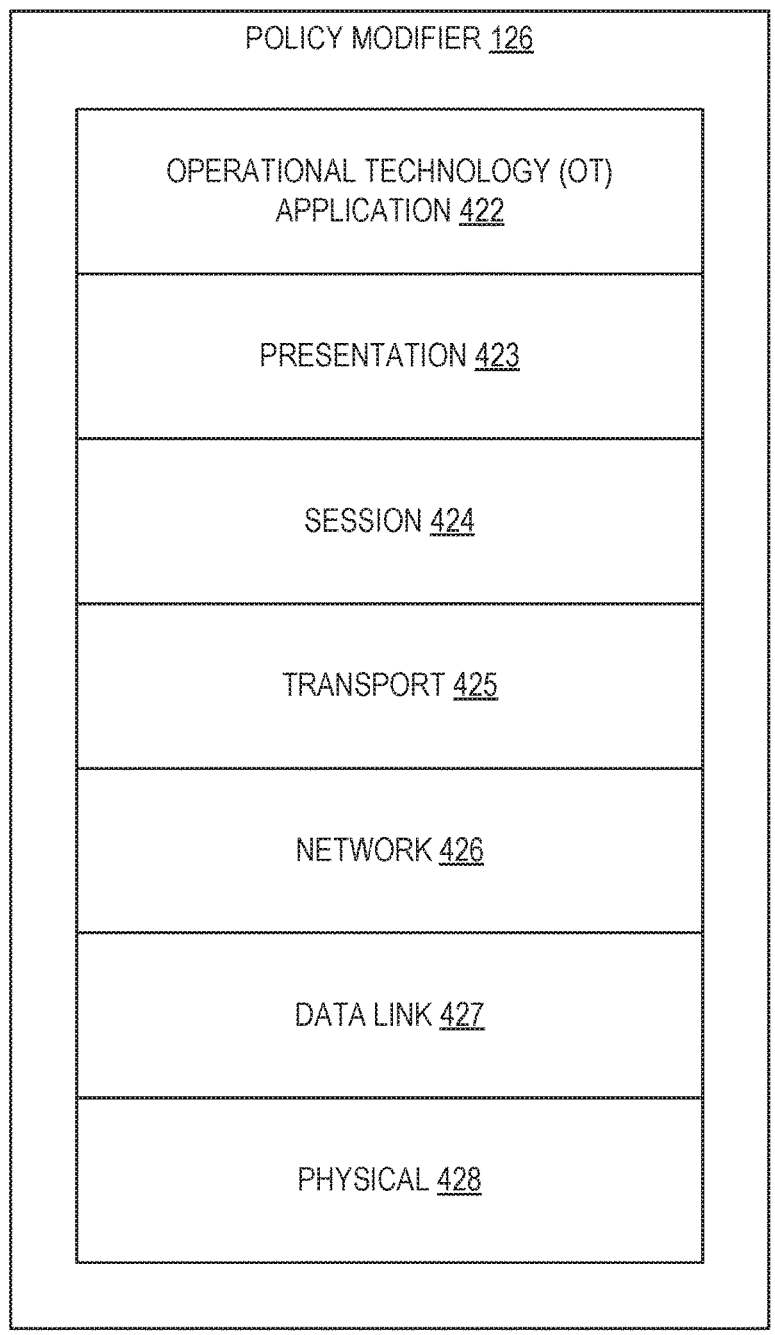
FIG. 4 is a diagram of an example embodiment of a network layer stack for policies implemented by an operational technology shunt with bypass.

FIG. 4 is a diagram of a network layer stack for policies implemented by a network shunt with bypass 127, according to some example embodiments. Policies are directed to one or more layers in the network layer stack including an OT application layer 422, a presentation layer 423, a session layer 424, a transport layer 425, a network layer 426, a data link layer 427, and a physical layer 428. Policies directed to the top layer, the OT application layer 422, are formed by the policy modifier 126. An example policy is directed at an OT protocol, such as DICOM, that borrows some aspects from an information technology protocol, but modifies others.

Figure 5:
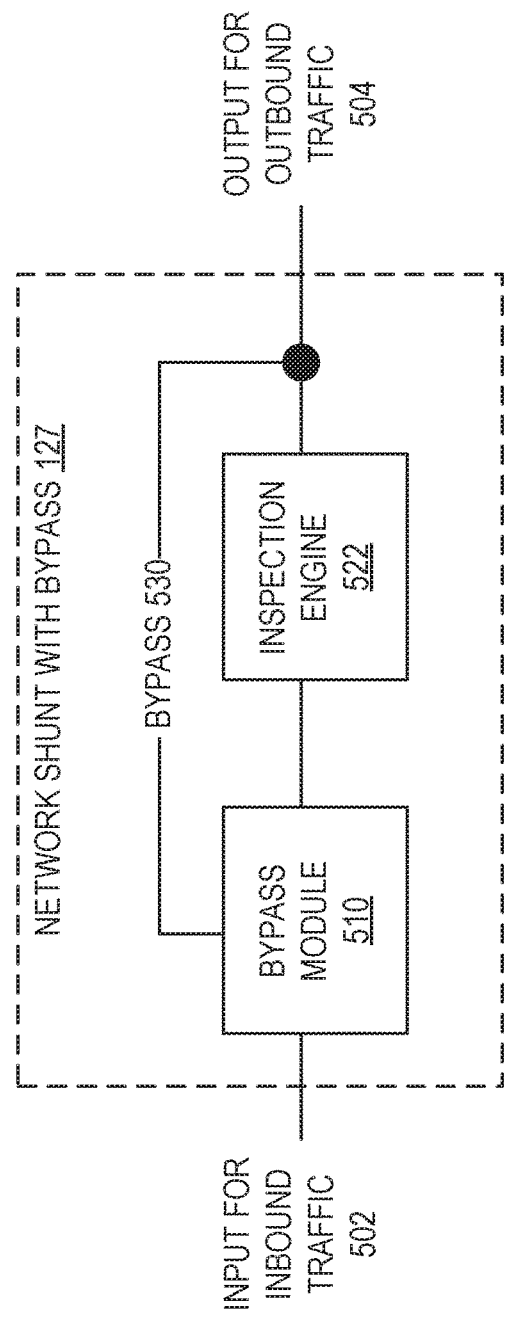
FIG. 5 is a block diagram of an example embodiment of an operational technology shunt with bypass with an operational technology inspection engine.

FIG. 5 is a block diagram of a network shunt with bypass 127, according to some example embodiments. The network shunt with bypass 127 receives inbound traffic via an input for inbound traffic 502. The network shunt with bypass 127 includes a bypass module 510 that applies a policy to bypass to the inbound traffic to determine whether or not the inbound traffic bypasses inspection. If, according to the policy to bypass, the inbound traffic bypasses inspection, then bypass module 510 forwards the inbound traffic along a bypass 530, which allows the traffic to pass to an output for outbound traffic 504. Examples of the inbound traffic moving past the traffic node also include copying, regenerating, or retransmitting the traffic past the traffic node. If, according to the policy to bypass, the bypass module 510 determines that the inbound traffic does not bypass inspection, then the inbound traffic is analyzed by an inspection engine 522. An example of a policy to bypass is a threshold traffic rate for inbound traffic at the network firewall system 120, such that part of the inbound traffic transits the bypass 530 if the inbound traffic rate exceeds the threshold traffic rate.

In one example, the policy to bypass is based on the type of network traffic. For example, the policy to bypass allows IT traffic such as Hypertext Transfer Protocol (HTTP) traffic to be transmitted to the bypass 530, but directs OT traffic such as DICOM traffic to the inspection engine 522. Further detail on example embodiments of the policy to bypass module 510 is discussed in connection with FIG. 7.

The inspection engine 522 analyzes the inbound traffic based on a set of predetermined security rules. Further detail on example embodiments of the inspection engine 522 is discussed in connection with FIG. 8. Depending on the outcome of the inspection engine 522, the inbound traffic is blocked or allowed to pass to the output for outbound traffic 504.

Figure 6:
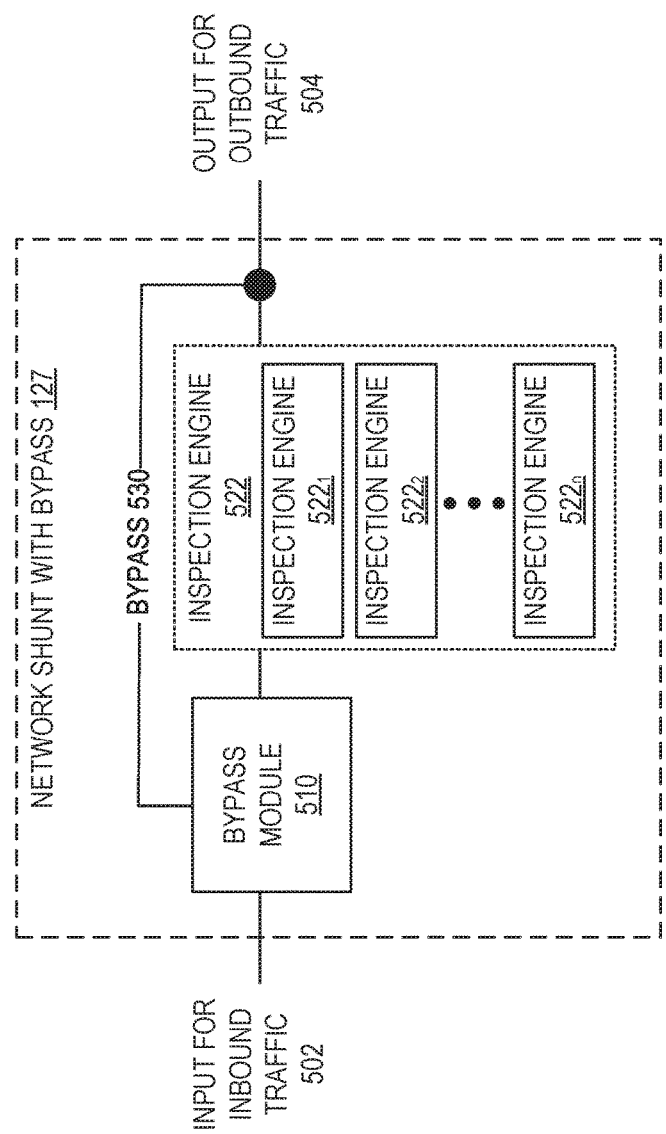
FIG. 6 is a block diagram of an example embodiment of an operational technology shunt with bypass with multiple instances of an operational technology inspection engine.

FIG. 6 is a block diagram of a network shunt with bypass 127 that includes multiple instances of an inspection engine 522, according to some example embodiments. FIG. 6 is similar to FIG. 5, but includes multiple instances of an inspection engine $522_1$, $522_2$ ... $522_n$ (collectively 522). Further detail on example embodiments of instances of the inspection engine 522 are discussed in connection with FIG. 8.

In some embodiments, the multiple instances of the inspection engine 522 provide additional bandwidth in the event that the rate of inbound traffic becomes overwhelming for a single instance of the inspection engine 522. For example, in the event that the rate of inbound traffic increases to a point where a first instance of inspection engine $522_1$ cannot handle processing inbound traffic at a desired rate, a second instance of the inspection engine $522_2$ begins to handle overflow of the inbound traffic so that the first instance of the inspection engine $522_1$ is not overwhelmed. As a result, latency remains constant as throughput increases. In one example, the first instance of the inspection engine $522_1$ delegates overflow traffic to the second instance of the inspection engine $522_2$, in the event that the first instance of the inspection engine $522_1$ becomes overwhelmed. In another example, data packets are balanced across multiple instances of the inspection engine 522 as they are received.

In an example embodiment, different instances of the inspection engine 522 are used to process different types of inbound traffic. For example, a first instance of the inspection engine $522_1$ may be used to process inbound traffic having a traffic protocol used for IT network data, and a second instance of the inspection engine $522_2$ may be used to process inbound traffic having a traffic protocol used for OT network data. In such an example embodiment, an inspection engine 522 may more easily be used to inspect only a subset of protocols, requiring less processing.

In an example embodiment, different instances of the inspection engine 522 are used to process data packets associated with varying latency requirements. Certain types of data can be assigned varying latency requirements that dictate a maximum acceptable latency for the data. As a result, high priority data can be assigned a lower maximum acceptable latency, thereby ensuring that the data reaches its destination within an acceptable amount of time. For example, a first instance of the inspection engine $522_1$ is used to process inbound traffic having a first latency requirement, and a second instance of the inspection engine is used to process inbound traffic having a second latency requirement. Designating one or more inspection engines 522 to handle inbound traffic with a higher latency requirement (i.e., a lower maximum acceptable latency) ensures that this higher priority data is handled separately than data with a lower latency requirement, thereby reducing latency associated with processing the data.

In an example embodiment, the bypass 530 applies to all instances of the inspection engine 522. In another example embodiment, the bypass 530 applies to a subset of instances of the inspection engine 522.

Figure 7:
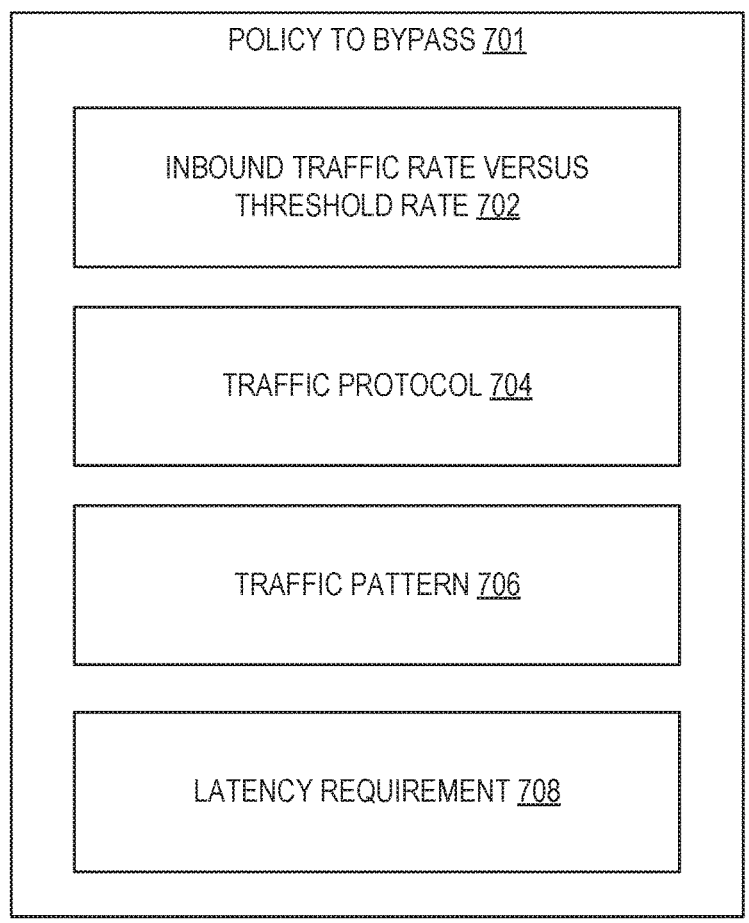
FIG. 7 is a simplified diagram of an example embodiment of a policy to bypass.

FIG. 7 is a simplified diagram of an example embodiment of a policy to bypass 701. Example policies are based on an inbound traffic rate versus a threshold rate 702, a traffic protocol 704, a traffic pattern 706, and a latency requirement 708. In one example embodiment, a single policy is applied. In another example embodiment, multiple policies are applied. In a further example embodiment, the policy or policies change over time or according to another condition.

An example of a policy based on the inbound traffic rate versus the threshold rate 702 allows sufficient traffic to bypass based on the capacity of the inspection engine 522. An example of a policy based on the traffic protocol 704 allows IT traffic to bypass, and causes OT traffic to be analyzed by the inspection engine 522. As another example, the policy based on the traffic protocol 704 allows OT traffic to bypass, and causes IT traffic to be analyzed by the inspection engine 522.

An example of a policy based on the traffic pattern 706 is based on a source endpoint and a destination endpoint of the traffic. An example policy causes inspection of only the traffic originating from workstation A (or multiple workstations A) and no other endpoints, only the traffic reaching workstation B (or multiple workstations B) and no other endpoints, or both.

An example of a policy based on the latency requirement 708 depends on the protocol. In one example embodiment, a protocol requires messages, such as alarms, to be passed from a generator to a controller within a time limit such as 200 ms, for safety reasons; otherwise, alarms are raised. To minimize false positives, a latency requirement limits the time it takes for the message to get from the generator to the controller. The latency requirement would be 200 ms per message. If inspecting the message causes travel time to exceed 150 ms per message, then the margin for error is small and the false positive rate high. Bypassing inspection may reduce the travel time to 50 ms per message, leading to a lower false positive rate. Inspection is inherently slower than no inspection because during inspection, each layer is dissected and analyzed.

Other example policies are based on a URI, content (a word or phrase), a user's IP address, a user's MAC address, or anything else being transported from the web server to the client, such as a browser.

Figure 8:
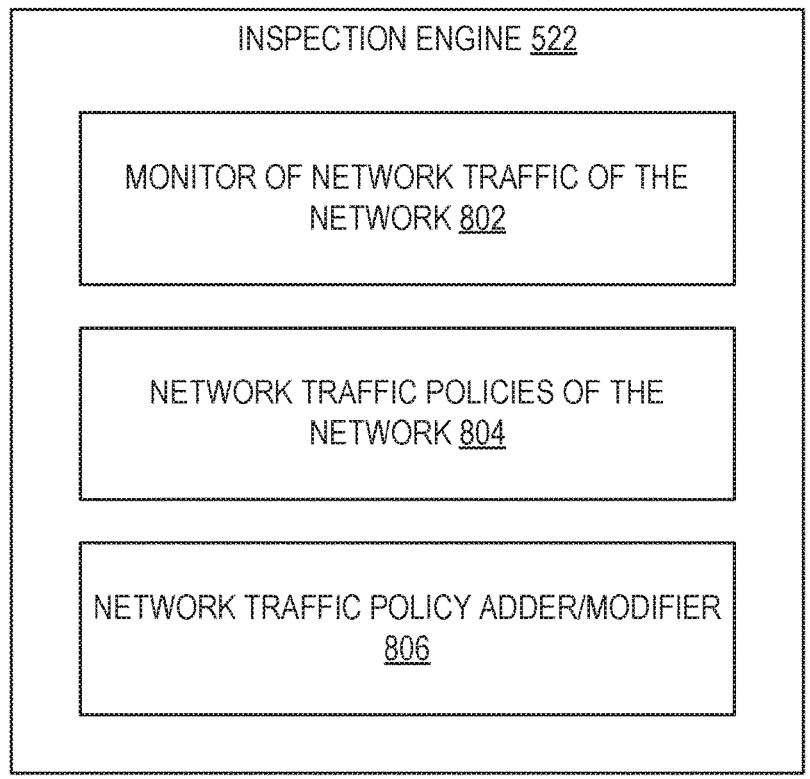
FIG. 8 is a simplified diagram of an example embodiment of an operational technology inspection engine.

FIG. 8 is a simplified diagram of an example embodiment of an inspection engine 522. In one example embodiment, the inspection engine 522 implements deep packet inspection where each packet is dissected into component protocols and filtered based on rules that may be from the user, from a default, and/or automatically generated. In one example embodiment, a protocol targets a specific controller or group of controllers. For example, in the healthcare industry, the DICOM protocol is used to transport information between medical imaging devices such as MRI machines and workstations or file servers. In one example policy, rules used by the inspection engine 522 block or alert on certain operations such as reading a patient file or CAT scan from a specific workstation to a file server.

The inspection engine 522 includes a monitor of network traffic of the network 802, network traffic policies of the network 804, and a network traffic policy adder/modifier 806. The monitor of network traffic of the network 802 performs monitoring of network traffic in the network for a policy violation. The network traffic policies of the network 804 control the monitor of network traffic of the network 802. Example policies are shown in FIG. 7. The network traffic policy adder/modifier 806 responds to detection in the network traffic of a policy violation, and adds a new policy or modifies an existing policy.

Figure 9:
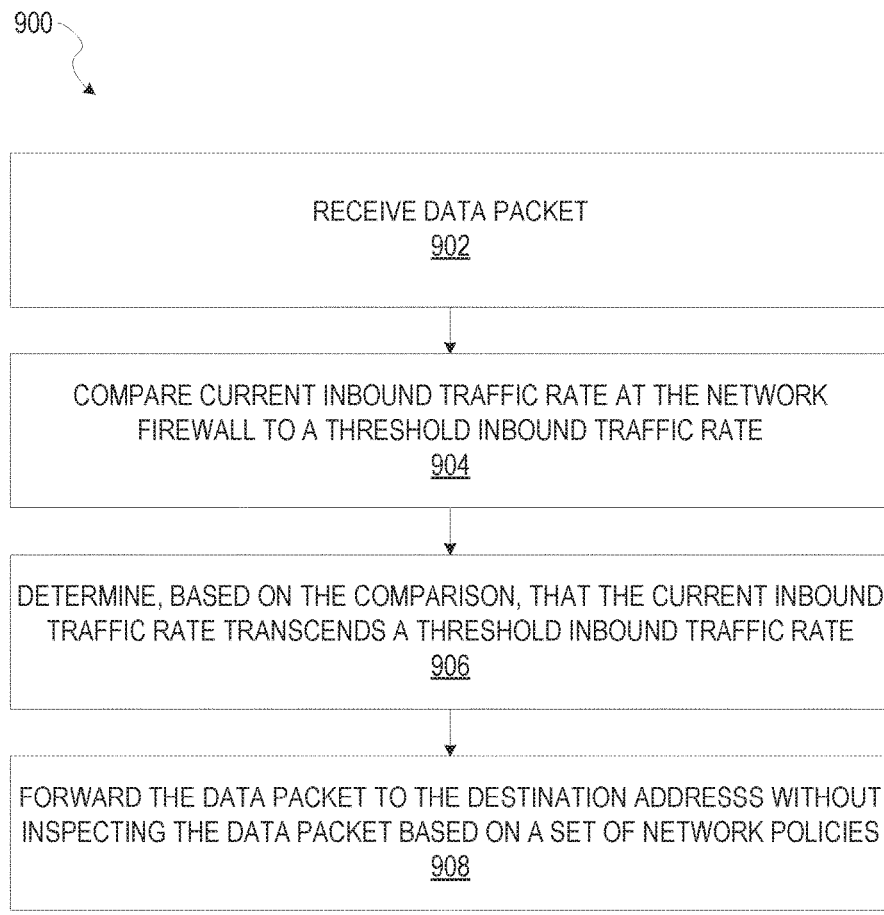
FIG. 9 is a flowchart illustrating a method for a network firewall including a network shunt with bypass, according to certain example embodiments.

FIG. 9 is a flowchart illustrating a method 900 for a network firewall including a network shunt with bypass, according to certain example embodiments. The method 900 may be embodied in computer-readable instructions for execution by one or more computer processors such that the operations of the method 900 may be performed in part or in whole by the network firewall system 120; accordingly, the method 900 is described below by way of example with reference thereto. However, it shall be appreciated that at least some of the operations of the method 900 may be deployed on various other hardware configurations and the method 900 is not intended to be limited to the network firewall system 120.

At operation 902, the network shunt with bypass 127 receives a data packet. The data packet is en route from an outside network to a destination address within an internal network secured by the network firewall system 120. The network firewall system 120 includes an inspection engine 522 that is configured to restrict access to the internal network based on a set of network policies.

At operation 904, the bypass module 510 compares the current inbound traffic rate at the network firewall system 120 to a threshold inbound traffic rate. The inbound traffic rate indicates the number of data packets being received at the network firewall system 120.

At operation 906, the bypass module 510 determines, based on the comparison, that the current inbound traffic rate transcends a threshold inbound traffic rate. This indicates that network traffic at the network firewall system 120 is high, which can lead to increased network latency. Transcending the threshold inbound traffic rate can include the current inbound traffic rate meeting or exceeding the threshold inbound traffic rate.

At operation 908, the bypass module 510 forwards the data packet to the destination address without inspecting the data packet based on a set of network policies. That is, the data packet bypasses 530 the inspection engine 522 and is transmitted towards the destination address within the internal network. By bypassing 530 the inspection engine 522, the network shunt with bypass 127 alleviates the burden on the inspection engine 522, thereby reducing network latency associated with inspecting the data packet.

In some embodiments, the bypass module 510 causes all data packets to bypass 530 the inspection engine 522 while the current inbound traffic rate transcends the threshold inbound traffic rate. Alternatively, the bypass module 510 only causes a subset of data packets received while the current inbound traffic rate transcends the threshold inbound traffic rate to bypass 530 the inspection engine 522. For example, the bypass module 510 can cause subsets of data packets to bypass 530 the inspection engine 522 based on an acceptable latency level associated with the data packet, a messaging protocol of the data packet, etc.

For example, in some embodiments, the bypass module 510 determines an acceptable network latency level associated with a data packet. The acceptable network latency level can be based on destination address, source address, data type, protocol, etc. The bypass module 510 determines, based on the acceptable network latency level, whether to forward the data packet to the inspection engine 522 or to bypass 530 the inspection engine 522. For example, if the acceptable network latency level is low, meaning that speed is high priority, the bypass module 510 causes the data packet to bypass 530 the inspection engine 522. In contrast, if the acceptable network latency level is high, meaning that speed is not as high a priority, the bypass module 510 provides the data packet to the inspection engine 522.

As another example, the bypass module 510 determines whether to provide the data packet to the inspection engine 522 or to bypass 530 the inspection engine 522 based on a messaging protocol of the data packet. For example, the bypass module 510 provides data packets with OT messaging protocols to the inspection engine 522, and causes data packets with IT messaging protocols to bypass 530 the inspection engine 522.

Figure 10:
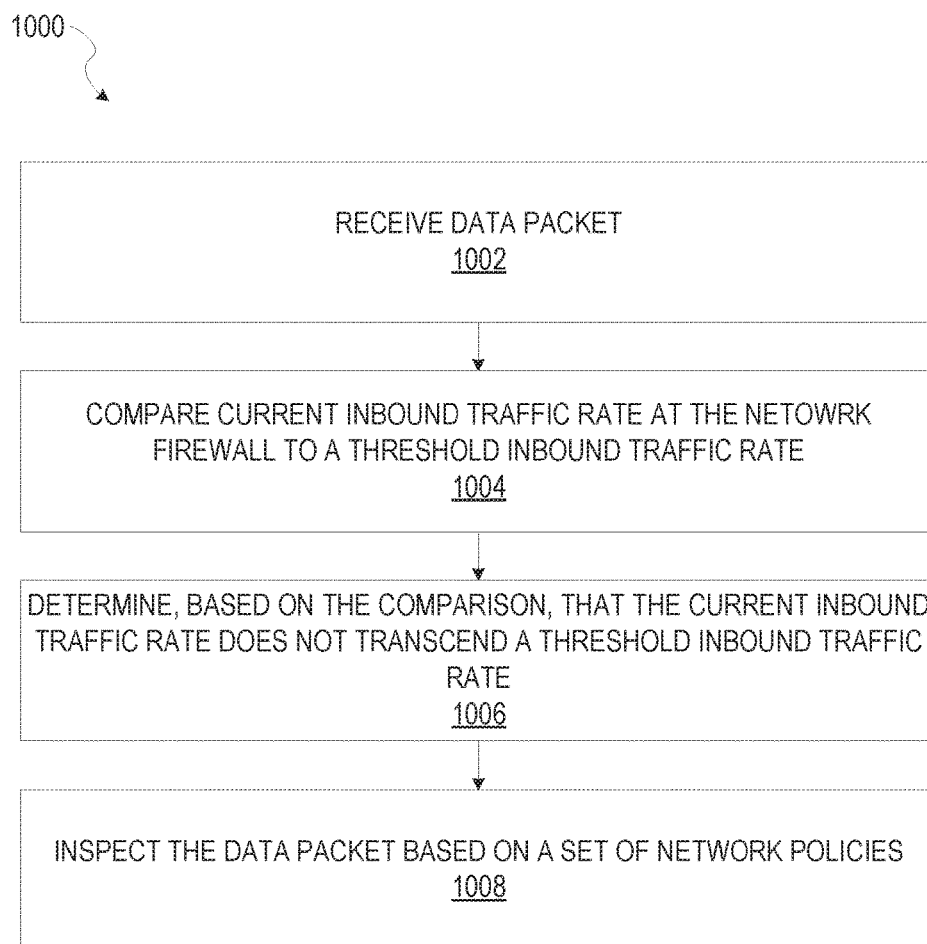
FIG. 10 is a flowchart illustrating another method for a network firewall including a network shunt with bypass, according to certain example embodiments.

FIG. 10 is a flowchart illustrating another method 1000 for a network firewall including a network shunt with bypass, according to certain example embodiments. The method 1000 may be embodied in computer-readable instructions for execution by one or more computer processors such that the operations of the method 1000 may be performed in part or in whole by the network firewall system 120; accordingly, the method 1000 is described below by way of example with reference thereto. However, it shall be appreciated that at least some of the operations of the method 1000 may be deployed on various other hardware configurations and the method 1000 is not intended to be limited to the network firewall system 120.

At operation 1002, the network shunt with bypass 127 receives a data packet. The data packet is en route from an outside network to a destination address within an internal network secured by the network firewall system 120. The network firewall system 120 includes an inspection engine 522 that is configured to restrict access to the internal network based on a set of network policies.

At operation 1004, the bypass module 510 compares the current inbound traffic rate at the network firewall system 120 to a threshold inbound traffic rate. The inbound traffic rate indicates the number of data packets being received at the network firewall system 120.

At operation 1006, the bypass module 510 determines, based on the comparison, that the current inbound traffic rate does not transcend a threshold inbound traffic rate. This indicates that network traffic at the network firewall system 120 is not high and network latency should not be an issue.

At operation 1008, the inspection engine 522 inspects the data packet based on the set of network policies. If the inspection engine 522 determines that the data packet satisfies the set of network policies, the inspection engine 522 forwards the data packet to its destination address within the internal network. Alternatively, if the inspection engine 522 determines that the data packet satisfies the set of network policies, the inspection engine 522 blocks the data packet to its destination address within the internal network.

Software Architecture

Figure 11:
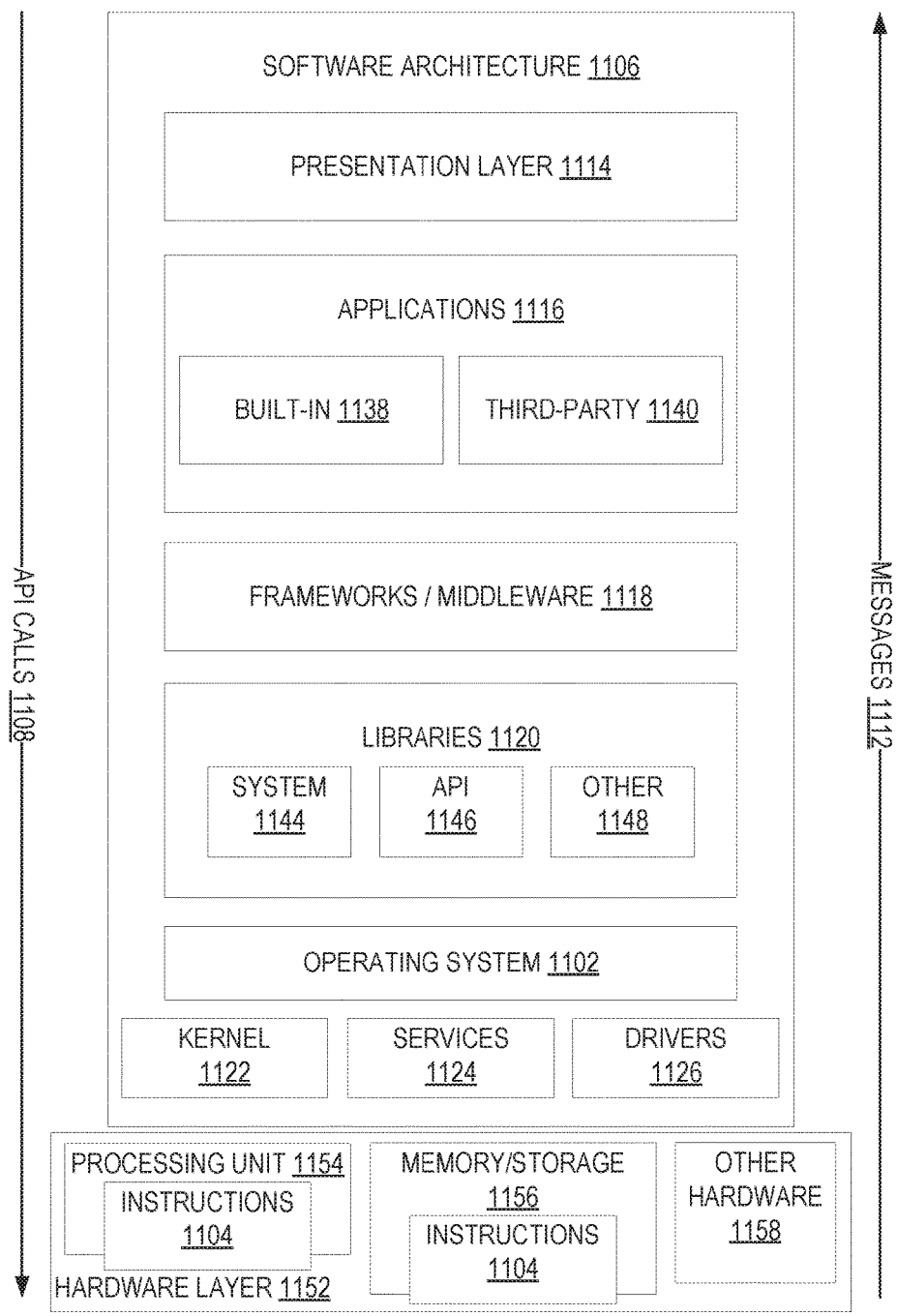
FIG. 11 is a block diagram illustrating an example software architecture, which may be used in conjunction with various hardware architectures herein described.

FIG. 11 is a block diagram illustrating an example software architecture 1106, which may be used in conjunction with various hardware architectures herein described. FIG. 11 is a non-limiting example of a software architecture and it will be appreciated that many other architectures may be implemented to facilitate the functionality described herein. The software architecture 1106 may execute on hardware such as machine 1200 of FIG. 12 that includes, among other things, processors 1204, memory 1214, and I/O components 1218. A representative hardware layer 1152 is illustrated and can represent, for example, the machine 1200 of FIG. 12. The representative hardware layer 1152 includes a processing unit 1154 having associated executable instructions 1104. Executable instructions 1104 represent the executable instructions of the software architecture 1106, including implementation of the methods, components and so forth described herein. The hardware layer 1152 also includes memory and/or storage modules memory/storage 1156, which also have executable instructions 1104. The hardware layer 1152 may also comprise other hardware 1158.

In the example architecture of FIG. 11, the software architecture 1106 may be conceptualized as a stack of layers where each layer provides particular functionality. For example, the software architecture 1106 may include layers such as an operating system 1102, libraries 1120, applications 1116 and a presentation layer 1114. Operationally, the applications 1116 and/or other components within the layers may invoke Application Programming Interface (API) calls 1108 through the software stack and receive a response 1112 as in response to the API calls 1108. The layers illustrated are representative in nature and not all software architectures have all layers. For example, some mobile or special purpose operating systems may not provide a frameworks/middleware 1118, while others may provide such a layer. Other software architectures may include additional or different layers.

The operating system 1102 may manage hardware resources and provide common services. The operating system 1102 may include, for example, a kernel 1122, services 1124, and drivers 1126. The kernel 1122 may act as an abstraction layer between the hardware and the other software layers. For example, the kernel 1122 may be responsible for memory management, processor management (e.g., scheduling), component management, networking, security settings, and so on. The services 1124 may provide other common services for the other software layers. The drivers 1126 are responsible for controlling or interfacing with the underlying hardware. For instance, the drivers 1126 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1120 provide a common infrastructure that is used by the applications 1116 and/or other components and/or layers. The libraries 1120 provide functionality that allows other software components to perform tasks in an easier fashion than to interface directly with the underlying operating system 1102 functionality (e.g., kernel 1122, services 1124 and/or drivers 1126). The libraries 1120 may include system libraries 1144 (e.g., C standard library) that may provide functions such as memory allocation functions, string manipulation functions, mathematical functions, and the like. In addition, the libraries 1120 may include API libraries 1146 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1120 may also include a wide variety of other libraries 1148 to provide many other APIs to the applications 1116 and other software components/modules.

The frameworks/middleware 1118 (also sometimes referred to as middleware) provide a higher-level common infrastructure that may be used by the applications 1116 and/or other software components/modules. For example, the frameworks/middleware 1118 may provide various graphic user interface (GUI) functions, high-level resource management, high-level location services, and so forth. The frameworks/middleware 1118 may provide a broad spectrum of other APIs that may be utilized by the applications 1116 and/or other software components/modules, some of which may be specific to a particular operating system 1102 or platform.

The applications 1116 include built-in applications 1138 and/or third-party applications 1140. Examples of representative built-in applications 1138 may include, but are not limited to, a contacts application, a browser application, a book reader application, a location application, a media application, a messaging application, and/or a game application. Third-party applications 1140 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1140 may invoke the API calls 1108 provided by the mobile operating system (such as operating system 1102) to facilitate functionality described herein.

The applications 1116 may use built in operating system functions (e.g., kernel 1122, services 1124, and/or drivers 1126), libraries 1120, and frameworks/middleware 1118 to create user interfaces to interact with users of the system. Alternatively, or additionally, in some systems interactions with a user may occur through a presentation layer, such as presentation layer 1114. In these systems, the application/component "logic" can be separated from the aspects of the application/component that interact with a user.

Example Machine Architecture and
Machine-Readable Medium

Figure 12:
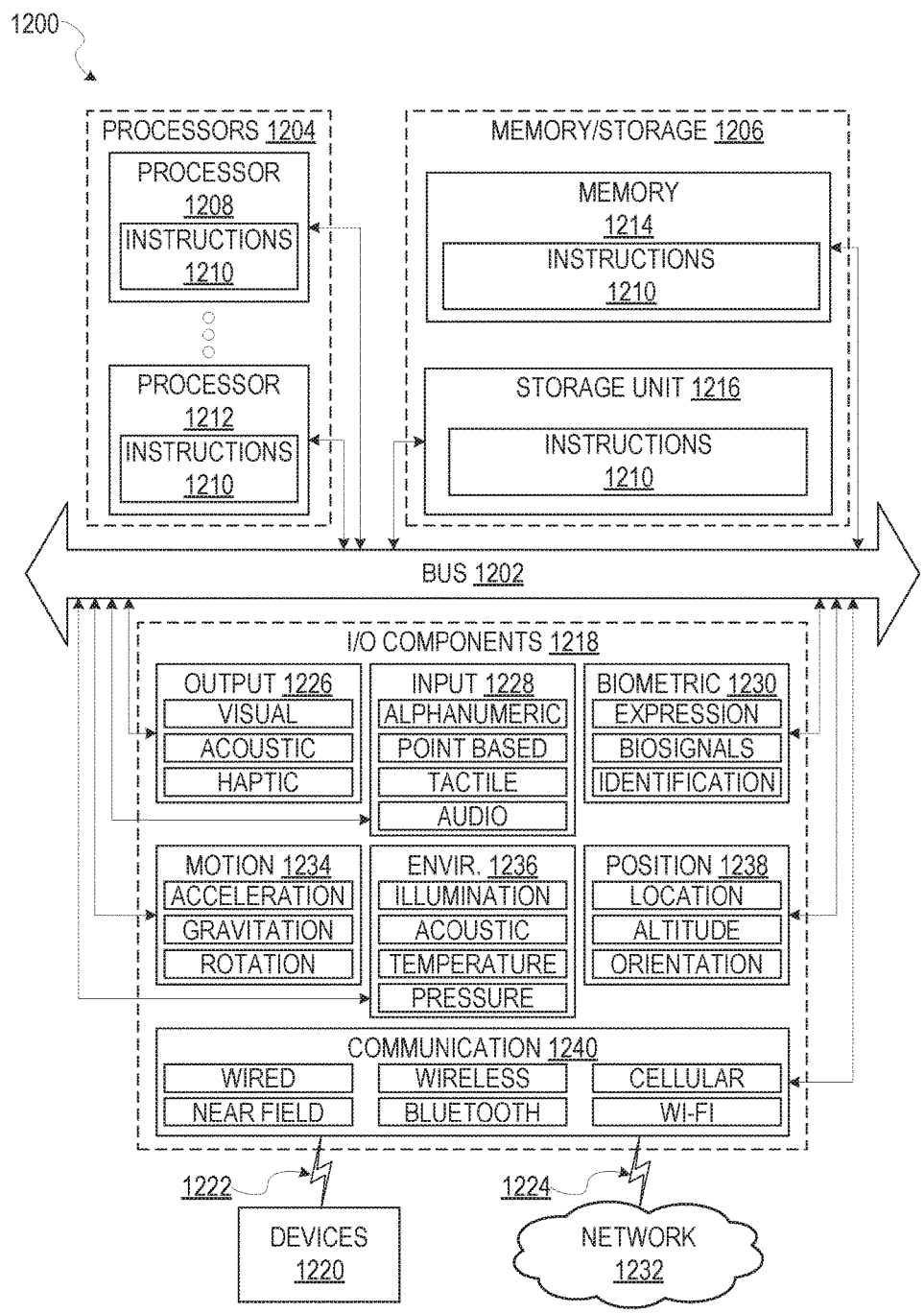
FIG. 12 is a block diagram illustrating components of a machine, according to some example embodiments, able to read instructions from a machine-readable medium (e.g., a machine-readable storage medium) and perform any one or more of the methodologies discussed herein.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1210 (e.g., software, a program, an application, an applet, an app, or other executable code) for causing the machine 1200 to perform any one or more of the methodologies discussed herein may be executed. As such, the instructions 1210 may be used to implement modules or components described herein. The instructions 1210 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1210, sequentially or otherwise, that specify actions to be taken by machine 1200. Further, while only a single machine 1200 is illustrated, the term "machine" shall also be taken to include a collection of machines that individually or jointly execute the instructions 1210 to perform any one or more of the methodologies discussed herein.

The machine 1200 may include processors 1204, memory memory/storage 1206, and I/O components 1218, which may be configured to communicate with each other such as via a bus 1202. The memory/storage 1206 may include a memory 1214, such as a main memory, or other memory storage, and a storage unit 1216, both accessible to the processors 1204 such as via the bus 1202. The storage unit 1216 and memory 1214 store the instructions 1210 embodying any one or more of the methodologies or functions described herein. The instructions 1210 may also reside, completely or partially, within the memory 1214, within the storage unit 1216, within at least one of the processors 1204 (e.g., within the processor's cache memory), or any suitable combination thereof, during execution thereof by the machine 1200. Accordingly, the memory 1214, the storage unit 1216, and the memory of processors 1204 are examples of machine-readable media.

The I/O components 1218 may include a wide variety of components to receive input, provide output, produce output, transmit information, exchange information, capture measurements, and so on. The specific I/O components 1218 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1218 may include many other components that are not shown in FIG. 12. The I/O components 1218 are grouped according to functionality merely for simplifying the following discussion and the grouping is in no way limiting. In various example embodiments, the I/O components 1218 may include output components 1226 and input components 1228. The output components 1226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1228 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1218 may include biometric components 1230, motion components 1234, environmental components 1236, or position components 1238 among a wide array of other components. For example, the biometric components 1230 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1234 may include acceleration sensor components (e.g., accelerometer), gravitation sensor components, rotation sensor components (e.g., gyroscope), and so forth. The environmental components 1236 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1218 may include communication components 1240 operable to couple the machine 1200 to a network 1232 or devices 1220 via coupling 1222 and coupling 1224, respectively. For example, the communication components 1240 may include a network interface component or other suitable device to interface with the network 1232. In further examples, communication components 1240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1220 may be another machine or any of a wide variety of peripheral devices (e.g., a peripheral device coupled via a USB).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1240, such as, location via IP geo-location, location via Wi-Fi® signal triangulation, location via detecting a NFC beacon signal that may indicate a particular location, and so forth.

Transmission Medium

In various example embodiments, one or more portions of the network 1232 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1232 or a portion of the network 1232 may include a wireless or cellular network and the coupling 1224 may be a Code Division Multiple Access (CDMA) connection, a Global System for Mobile communications (GSM) connection, or another type of cellular or wireless coupling. In this example, the coupling 1224 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 1210 may be transmitted or received over the network 1232 using a transmission medium via a network interface device (e.g., a network interface component included in the communication components 1240) and utilizing any one of a number of well-known transfer protocols (e.g., HTTP). Similarly, the instructions 1210 may be transmitted or received using a transmission medium via the coupling 1222 (e.g., a peer-to-peer coupling) to the devices 1220. The term "transmission medium" shall be taken to include any intangible medium that is capable of storing, encoding, or carrying the instructions 1210 for execution by the machine 1200, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    receiving, by a network firewall, a first incoming data packet that is transmitted from an outside network to a destination within an internal network secured by the network firewall, the network firewall configured to restrict access to the internal network based on a set of network policies;
    comparing, by the network firewall, a current inbound traffic rate at the network firewall to a threshold inbound traffic rate, yielding a comparison;
    determining, based on the comparison, that the current inbound traffic rate at the network firewall is greater than the threshold inbound traffic rate;
    forwarding, by the network firewall, the first incoming data packet to the destination within the internal network without inspecting the first incoming data packet based on the set of network policies when the current inbound traffic rate at the network firewall is greater than the threshold inbound traffic rate;
    receiving, at the network firewall, a second incoming data packet that is transmitted from the outside network to a second destination within the internal network;
    determining that the current inbound traffic rate at the network firewall is not greater than the threshold inbound traffic rate; and
    inspecting, by the network firewall, the second incoming data packet according to the set of network policies when the current inbound traffic rate at the network firewall is not greater than the threshold inbound traffic rate, yielding an inspection.

2. The method of claim 1, further comprising:
    determining, based on the inspection, that the second incoming data packet satisfies the set of network policies; and
    forwarding the second incoming data packet to the second destination within the internal network.

3. The method of claim 1, further comprising:
    determining, based on the inspection, that the second incoming data packet does not satisfy the set of network policies; and blocking the second incoming data packet from entering the internal network.

4. The method of claim 1, further comprising:
determining an acceptable network latency level associated with the first incoming data packet; and
determining, based on the acceptable network latency level associated with the first incoming data packet, to forward the first incoming data packet to the destination within the internal network without inspecting the first incoming data packet based on the set of network policies.

5. The method of claim 4, further comprising:
receiving, at the network firewall, a second incoming data packet that is transmitted from the outside network to a second destination within the internal network when the current inbound traffic rate at the networking firewall is greater than the threshold inbound traffic rate;
determining an acceptable latency level associated with the second incoming data packet, the acceptable latency level associated with the second incoming data packet being higher than the acceptable latency level associated with the first incoming data packet; and
determining, based on the acceptable latency level associated with the second incoming data packet, to inspect the second inbound data packet based on the set of network policies.

6. The method of claim 1, further comprising:
determining a messaging protocol of the first incoming data packet; and
determining, based on the messaging protocol of the first incoming data packet, to forward the first incoming data packet to the destination within the internal network without inspecting the first incoming data packet based on the set of network policies.

7. The method of claim 6, further comprising:
receiving, at the network firewall, a second incoming data packet that is transmitted from the outside network to a second destination within the internal network when the current inbound traffic rate at the networking firewall is greater than the threshold inbound traffic rate;
determining a messaging protocol of the second incoming data packet, the messaging protocol of the second incoming data packet being different than the messaging protocol of the first incoming data packet; and
determining, based on the messaging protocol of the second incoming data packet, to inspect the second inbound data packet based on the set of network policies.

8. The method of claim 7, wherein the messaging protocol of the first incoming data packet is an information technology protocol and the messaging protocol of the second incoming data packet is an operational technology protocol.

9. The method of claim 1, wherein the network firewall is a virtual network firewall.

10. A network firewall system comprising:
one or more computer processors; and
one or more computer-readable mediums storing instructions that, when executed by the one or more computer processors, cause the network firewall system to perform operations comprising:
receiving a first incoming data packet that is transmitted from an outside network to a destination within an internal network secured by the network firewall system, the network firewall system configured to restrict access to the internal network based on a set of network policies;
comparing a current inbound traffic rate at the network firewall system to a threshold inbound traffic rate, yielding a comparison;
determining, based on the comparison, that the current inbound traffic rate at the network firewall system is greater than the threshold inbound traffic rate; and
forwarding the first incoming data packet to the destination within the internal network without inspecting the first incoming data packet based on the set of network policies when the current inbound traffic rate at the network firewall system is greater than the threshold inbound traffic rate;
receiving a second incoming data packet that is transmitted from the outside network to a second destination within the internal network;
determining that the current inbound traffic rate at the network firewall system is not greater than the threshold inbound traffic rate; and
inspecting the second incoming data packet according to the set of network policies when the current inbound traffic rate at the network firewall system is not greater than the threshold inbound traffic rate, yielding an inspection.

11. The network firewall system of claim 10, the operations further comprising:
determining, based on the inspection, that the second incoming data packet satisfies the set of network policies; and
forwarding the second incoming data packet to the second destination within the internal network.

12. The network firewall system of claim 10, the operations further comprising:
determining, based on the inspection, that the second incoming data packet does not satisfy the set of network policies; and
blocking the second incoming data packet from entering the internal network.

13. The network firewall system of claim 10, the operations further comprising:
determining an acceptable network latency level associated with the first incoming data packet; and
determining, based on the acceptable network latency level associated with the first incoming data packet, to forward the first incoming data packet to the destination within the internal network without inspecting the first incoming data packet based on the set of network policies.

14. The network firewall system of claim 13, the operations further comprising:
receiving a second incoming data packet that is transmitted from the outside network to a second destination within the internal network when the current inbound traffic rate at the network firewall system is greater than the threshold inbound traffic rate;
determining an acceptable latency level associated with the second incoming data packet, the acceptable latency level associated with the second incoming data packet being higher than the acceptable latency level associated with the first incoming data packet; and
determining, based on the acceptable latency level associated with the second incoming data packet, to inspect the second inbound data packet based on the set of network policies.

15. The network firewall system of claim 10, the operations further comprising:
determining a messaging protocol of the first incoming data packet; and determining, based on the messaging protocol of the first incoming data packet, to forward the first incoming data packet to the destination within the internal network without inspecting the first incoming data packet based on the set of network policies.

16. The network firewall system of claim 15, the operations further comprising:
receiving a second incoming data packet that is transmitted from the outside network to a second destination within the internal network when the current inbound traffic rate at the network firewall system is greater than the threshold inbound traffic rate;
determining a messaging protocol of the second incoming data packet, the messaging protocol of the second incoming data packet being different than the messaging protocol of the first incoming data packet; and
determining, based on the messaging protocol of the second incoming data packet, to inspect the second inbound data packet based on the set of network policies.

17. The network firewall system of claim 16, wherein the messaging protocol of the first incoming data packet is an information technology protocol and the messaging protocol of the second incoming data packet is an operational technology protocol.

18. A non-transitory computer-readable medium storing instructions that, when executed by one or more computer processors of a network firewall, cause the network firewall to perform operations comprising:

receiving, by the network firewall, a first incoming data packet that is transmitted from an outside network to a destination within an internal network secured by the network firewall, the network firewall configured to restrict access to the internal network based on a set of network policies;
comparing, by the network firewall, a current inbound traffic rate at the network firewall to a threshold inbound traffic rate, yielding a comparison;
determining, based on the comparison, that the current inbound traffic rate at the network firewall in greater than the threshold inbound traffic rate;
forwarding, by the network firewall, the first incoming data packet to the destination within the internal network without inspecting the first incoming data packet based on the set of network policies when the current inbound traffic rate at the network firewall is greater than the threshold inbound traffic rate;
receiving, at the network firewall, a second incoming data packet that is transmitted from the outside network to a second destination within the internal network;
determining that the current inbound traffic rate at the network firewall is not greater than the threshold inbound traffic rate; and
inspecting, by the network firewall, the second incoming data packet according to the set of network policies when the current inbound traffic rate at the network firewall is not greater than the threshold inbound traffic rate, yielding an inspection.

* * * * *